United States Patent
Flaum et al.

(10) Patent No.: US 11,142,177 B2
(45) Date of Patent: Oct. 12, 2021

(54) METHOD FOR ADJUSTING BRAKE PRESSURES, BRAKE SYSTEM OF A MOTOR VEHICLE FOR CARRYING OUT SUCH METHOD, AND MOTOR VEHICLE COMPRISING SUCH A BRAKE SYSTEM

(71) Applicant: WABCO Europe BVBA, Brussels (BE)

(72) Inventors: Nikolai Flaum, Hannover (DE); Van Tien Nguyen, Hannover (DE); Torsten Wallbaum, Duingen (DE)

(73) Assignee: ZF CV SYSTEMS EUROPE BV, Brussels (BE)

(*) Notice: Subject to any disclaimer, the term of this patent is extended or adjusted under 35 U.S.C. 154(b) by 221 days.

(21) Appl. No.: 16/325,189

(22) PCT Filed: Jun. 20, 2017

(86) PCT No.: PCT/EP2017/000710
§ 371 (c)(1),
(2) Date: Feb. 13, 2019

(87) PCT Pub. No.: WO2018/033228
PCT Pub. Date: Feb. 22, 2018

(65) Prior Publication Data
US 2019/0168723 A1    Jun. 6, 2019

(30) Foreign Application Priority Data

Aug. 17, 2016 (DE) ..................... 10 2016 009 996.8

(51) Int. Cl.
*B60T 8/17* (2006.01)
*B60T 8/1761* (2006.01)
(Continued)

(52) U.S. Cl.
CPC ........ *B60T 8/17616* (2013.01); *B60T 8/1766* (2013.01); *B60T 8/34* (2013.01); *B60T 2250/04* (2013.01); *B60T 2270/10* (2013.01)

(58) Field of Classification Search
CPC ...... B60T 8/17616; B60T 8/34; B60T 8/1766; B60T 2250/04; B60T 2270/10
See application file for complete search history.

(56) References Cited

U.S. PATENT DOCUMENTS

| | | | | |
|---|---|---|---|---|
| 4,564,244 A | * | 1/1986 | Reinartz | B60T 11/34 188/349 |
| 4,674,804 A | * | 6/1987 | Burgdorf | B60T 8/267 188/181 T |

(Continued)

FOREIGN PATENT DOCUMENTS

| | | |
|---|---|---|
| DE | 3829951 A1 | 3/1990 |
| DE | 102008032544 A1 | 2/2009 |
| EP | 0445575 A2 | 9/1991 |

*Primary Examiner* — Mary Cheung
(74) *Attorney, Agent, or Firm* — Leydig, Voit & Mayer, Ltd.

(57) ABSTRACT

A method for operating an electronic brake system for motor vehicles includes determining, by a brake control unit, respective brake pressures acting on wheel brakes by controlling a pressure distribution ratio of brake pressures acting on wheel brakes of a front axle to brake pressures acting on wheel brakes of a rear axle of the motor vehicle. The method further includes receiving, by the brake control unit, driver brake requests determined by a driver of the motor vehicle and/or external brake requests and determining, by the brake control unit, appropriate brake pressures. The brake control unit takes into consideration an initial pressure distribution ratio value, which is ascertained in a driver braking mode or in a pressure control mode and is stored and kept available for later consideration.

7 Claims, 2 Drawing Sheets

(51) Int. Cl.
*B60T 8/1766* (2006.01)
*B60T 8/34* (2006.01)

(56) References Cited

U.S. PATENT DOCUMENTS

| | | | |
|---|---|---|---|
| 5,011,236 A | | 4/1991 | Toepfer et al. |
| 5,163,742 A | | 11/1992 | Toepfer et al. |
| 5,496,099 A | * | 3/1996 | Resch ............... B60T 7/042 |
| | | | 303/113.4 |
| 5,611,606 A | * | 3/1997 | Nell ............... B60T 8/266 |
| | | | 303/115.2 |
| 6,496,769 B1 | * | 12/2002 | O'Dea ............... B60T 8/1766 |
| | | | 180/198 |
| 2008/0100129 A1 | * | 5/2008 | Lubbers ............... B60L 7/18 |
| | | | 303/113.1 |
| 2014/0188363 A1 | * | 7/2014 | Eckert ............... B60T 8/266 |
| | | | 701/70 |

* cited by examiner

METHOD FOR ADJUSTING BRAKE PRESSURES, BRAKE SYSTEM OF A MOTOR VEHICLE FOR CARRYING OUT SUCH METHOD, AND MOTOR VEHICLE COMPRISING SUCH A BRAKE SYSTEM

CROSS REFERENCE TO RELATED APPLICATIONS

This application is a U.S. National Stage Application under 35 U.S.C. § 371 of International Application No. PCT/EP2017/000710 filed on Jun. 20, 2017, and claims benefit to German Patent Application No. DE 10 2016 009 996.8 filed on Aug. 17, 2016. The International Application was published in German on Feb. 22, 2018, as WO 2018/033228 A1 under PCT Article 21(2).

FIELD

The invention relates to a method for operating an electronic brake system for a motor vehicle, to an electronic brake system for carrying out such a method, and to a motor vehicle having a brake system of this type.

BACKGROUND

To slow down a motor vehicle, the wheels of the motor vehicle are braked. To this end, each of the wheel brakes of the wheels has brake cylinders, which are actuated by means of a working medium, i.e. hydraulically or pneumatically. In commercial vehicles, the desired brake pressure in the brake cylinders is usually generated pneumatically.

Electronic brake systems, also called electronic braking systems (EBS), function with electrical control signals, which are produced by a central brake control unit, in order to control the brake system. The brake control unit communicates with the individual components of the electronic brake system. The pressure on the brake cylinders of the wheel brakes is generated in accordance with the control signals.

By means of speed sensors arranged on the wheels of the motor vehicle, the electronic brake system continuously receives current speed measurements and thus current information about the wheel velocities. Various integrated stability functions, such as the anti-locking function, the drag torque control or the electronic stability control (ESC), recognize deviations from the normal driving state and intervene in the driving process in the event of hazards.

Moreover, further brake management functions can be implemented, such as, for example, the deceleration control, brake force distribution, brake lining wear control or the brake assistant.

The electronic brake control unit is linked with a brake signal transmitter, which can be actuated by the driver of the motor vehicle, to receive a driver brake request. Furthermore, the brake control unit is configured to receive external brake requests. External brake requests are independent of the driver brake request and are sent, for example, by external driver assistance systems of the brake control unit. As systems that are separate from the control unit, driver assistance systems send brake request signals, i.e. XBR messages ("eXternal Brake Request"), corresponding to the desired braking power to the brake control unit of the brake system, for instance via a data bus.

In known electronic brake systems, the brake control unit attempts to achieve the most stable driving behavior possible when adjusting the brake pressures on the individual wheel brakes of the motor vehicle. In so doing, the brake pressure at the front wheels and the brake pressure at the rear wheels must be in a pressure distribution ratio at all times, i.e. especially when the motor vehicle has different loads and loading conditions, such that the front axle locks before the rear axle. The brake control unit thus sets the brake pressures on the wheel brakes by regulating a pressure distribution ratio of the brake pressures on the wheel brakes of the front axle to the brake pressures on the wheel brakes of the rear axle of the motor vehicle, and it identifies corresponding electrical control signals for the actuators of the brake system. Axle modulators are often employed, for which the brake control unit prescribes the nominal value of the brake pressure that it determines.

The evaluation of the wheel velocities calculated from the speed measurements results in an exact picture of the slip of each axle. If the slip is different, then the brake pressure on the front axle and rear axle should be regulated by differential slip control in such a way that the braking forces are optimally distributed with respect to adhesion.

DE 38 29 951 A1 discloses a method for carrying out a load-dependent control of the brake pressure in a commercial vehicle with an electric anti-lock braking system (ABS) with an electronic central control system and ABS brake valves near the axles as well as speed sensors on the brakable wheels as actual value sensors for an ABS control system. The known method utilizes the components of the available anti-lock braking system to implement an automatically load-dependent braking function (ALB) that also functions far below the locking threshold. In the known method, the brake pressure and thus the brake force distribution should be regulated to below the locking threshold in an axle-specific manner, wherein an inter-axle brake pressure distribution is automatically regulated solely according to the evaluation of the wheel speed signals provided by the speed sensors in a slip range below the range in which the anti-lock function takes effect. According to the known method, the inter-axle brake pressure distribution should be tracked starting from a stored vehicle-specific starting value.

SUMMARY

In an embodiment, the present invention provides a method for operating an electronic brake system for motor vehicles. The method includes determining, by a brake control unit, respective brake pressures acting on wheel brakes by controlling a pressure distribution ratio of brake pressures acting on wheel brakes of a front axle to brake pressures acting on wheel brakes of a rear axle of the motor vehicle. The method further includes receiving, by the brake control unit, driver brake requests determined by a driver of the motor vehicle and/or external brake requests and determining, by the brake control unit, appropriate brake pressures. The brake control unit takes into consideration an initial pressure distribution ratio value, which is ascertained in a driver braking mode or in a pressure control mode and is stored and kept available for later consideration.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
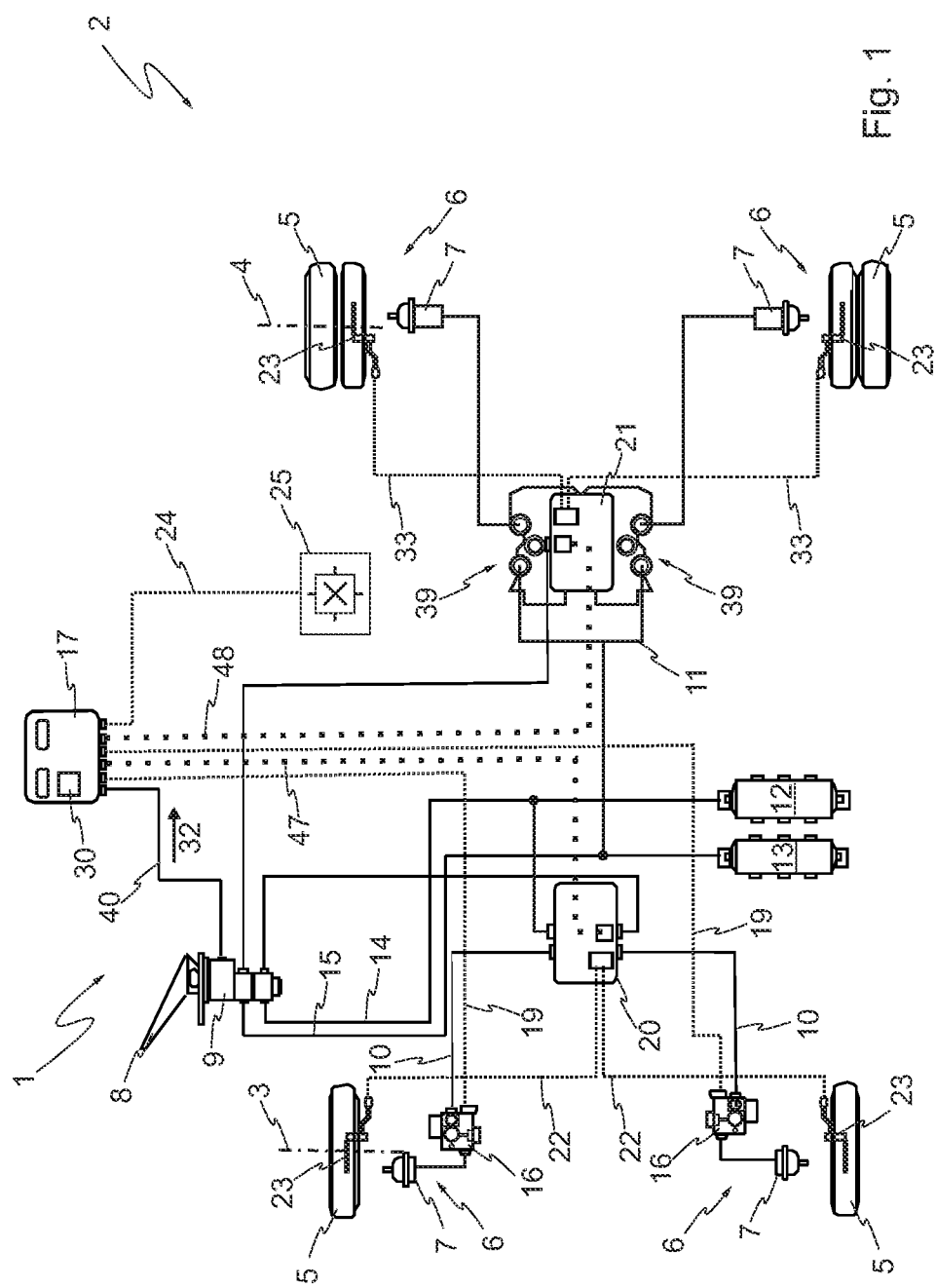
FIG. 1 is a pneumatic and electrical schematic diagram of an electronic brake system of a commercial vehicle.

The control of an optimal pressure distribution requires a particular amount of time before achieving the ideal pressure distribution ratio. While in this adaptation phase, the probability that one or more of the wheels will tend to lock during normal operation is high.

Embodiments of the present invention address the problem of permitting, in an electronic brake system, the fastest possible setting of the optimal brake pressure distribution by a brake control unit.

Embodiments of the invention provide methods for operating an electronic brake system, brake systems for carrying out such methods and, motor vehicles having such an electronic brake system.

According to the invention, in a driver braking mode with exclusive driver brake request, an initial value of the pressure distribution ratio (initial pressure distribution ratio value) is determined for a control system and is stored and kept available to be taken into account subsequently at the beginning of a braking operation, in particular for braking operations with the execution of other or further brake requests, such as external brake requests. The influence of the loading condition of the commercial vehicle on the ideal pressure distribution ratio is already taken into account by the calculation of the initial value of the pressure distribution ratio in the driver braking mode, and so the control system starts at a value that is already close to the ideal value to be adjusted of the pressure distribution ratio. In particular, the initial pressure distribution ratio value provides a precise estimate of the ideal brake pressure distribution ratio, which can be specified to the control system as an initial pressure distribution ratio value. Generally, only quantitatively small and usually few control system interventions are necessary in order to set the ideal pressure distribution ratio proceeding from the initial pressure distribution ratio value calculated according to the invention. The ideal pressure distribution ratio is preferably controlled by controlling the differential slip between the axles.

With the invention, initial pressure distribution ratio values are also calculated for motor vehicles with more than two axles, wherein axle pairs having two axles each are preferably considered and/or their pressure distribution ratios are controlled with the initial pressure distribution ratio value calculated during the driver braking mode in the manner according to the invention.

It is possible to calculate the initial pressure distribution ratio value in the driver braking mode with little information. In a preferred embodiment of the invention, the speed measurements of the wheels that are available to the brake control unit are used to determine the initial pressure distribution ratio value. In the process, the initial pressure distribution ratio value is ascertained by recording a first speed measurement of the front axle and a second speed measurement of the rear axle and by recording a reference value of a motion quantity of the motor vehicle at the same time of measurement in each case. The reference value can be measured by a separate motion sensor of the motor vehicle or can be derived from evaluations of the speed measurements of the axles. The speed measurements are determined by speed sensors on the respective wheels which are provided to the brake control unit. The first speed measurement of the front axle and the second speed measurement of the rear axle are each linked with the reference value in a manner that represents the wheel slip on each axle. Slip values, which are understood to include both the wheel slip and other physical motion quantities which determine the wheel slip, such as the velocity or acceleration, are identified for each axle in this way.

The first slip value relating to the front axle and the second slip value relating to the rear axle, which are generated in this way, are set in relation to each other, and the distribution index thereby determined is linked with the predetermined pressure distribution ratio.

Especially preferably, the electronic brake system draws upon a dynamically determined value of the pressure distribution ratio to link with the distribution index. The calculated value of the pressure distribution ratio in this instance can be a current value or a previously stored value.

In accordance with the assumption of the ideal pressure distribution ratio, namely that there should be no differential slip between the axles in question, the first slip values and the second slip values in the distribution index are considered inversely with reference to the axles in the pressure distribution ratio. This results in the following equation for determining the initial pressure distribution ratio value when the respective wheel slips are considered as slip values to be processed of the respective axles:

$$(P_{FA}/P_{RA}) = (\lambda_{RA}/\lambda_{FA}) * (P_{FA}/P_{RA})_{nonideal}$$

The brake pressures are indicated in the equation with the formula symbol "P". First slip values for the front axle and second slip values for the rear axle are determined as the respective wheel slip and are represented in the equation by the formula symbol "$\lambda$". The index "FA" in the equation stands for a variable assigned to the front axle. Accordingly, variables relating to the rear axle are designated with the index "RA". The dynamically determined pressure distribution ratio, which is treated as not ideal and, according to the invention, is linked with the distribution index, is designated with the index "nonideal".

Advantageously, in order to determine the slip values for the respective axles from the first speed value of the front axle and the second speed value of the rear axle, a translational motion quantity of the motor vehicle is determined and linked with the reference value in the same physical variable. In an advantageous embodiment, if the velocity is considered a motion quantity, then velocities are derived from the speed measurements of the axles, and the reference value is also calculated as the reference velocity of the motor vehicle. This results in the following equation for determining the initial pressure distribution ratio value:

$$(P_{FA}/P_{RA}) = ((v_{RA} - v_{Veh})/(v_{FA} - v_{Veh})) * (P_{FA}/P_{RA})_{nonideal}$$

In the above equation, the velocity is designated with the formula symbol "v". The index "Veh" refers to a reference variable relating to the motor vehicle, i.e. here, the reference velocity of the motor vehicle.

In a further advantageous embodiment of the invention, the acceleration is considered a motion quantity for determining the initial pressure distribution ratio value. This results in the following equation, in which the acceleration is designated with the formula symbol "a":

$$(P_{FA}/P_{RA}) = ((a_{RA} - a_{Veh})/(a_{FA} - a_{Veh})) * (P_{FA}/P_{RA})_{nonideal}$$

If no signal indicating vehicle velocity is provided to the brake control unit, then the measured value of a longitudinal acceleration sensor is used for the determination of the initial pressure distribution ratio value. If information about the longitudinal acceleration should also not be available, then the vehicle velocity is derived as a reference value from the individual speed measurements of the wheels, for example, the highest velocity value of the recorded wheels during a braking process is taken as a reference value to determine slip values.

FIG. 1 shows an electric-pneumatic schematic diagram of an electronic brake system 1 of a motor vehicle 2, specifically of a commercial vehicle. Electrical lines are indicated with dotted lines, and pneumatic lines are indicated with solid lines. In the exemplary embodiment shown, the motor vehicle 2 has two axles, namely a front axle 3, which is positioned ahead in the driving direction, and a rear axle 4, on each of which wheels 5 are arranged on both sides. To slow down the motor vehicle 2, a wheel brake 6 is associated with each wheel 5. The wheel brakes 6 can be actuated pneumatically, and each has a brake cylinder 7. In accordance with the pneumatic brake pressure acting in each brake cylinder 7, the wheel brakes 6 exert a braking force on the rotating wheel 5.

A brake pedal 8, which is coupled to a brake signal transmitter 9, is arranged in the driver compartment of the motor vehicle 2. The brake signal transmitter 9 is connected to the electronic brake control unit 17 of the brake system via a brake signal line 40. When the brake pedal 8 is actuated, the brake signal transmitter 9 sends the brake control unit 17 a brake signal qualitatively corresponding to the driver brake request 32.

In the exemplary embodiment shown, the brake system 1 has two brake circuits, wherein a first brake circuit 14 is associated with a first pressure medium supply 12 of the front axle 3, and a second brake circuit 15 is associated with a second pressure medium supply 13 of the rear axle 4.

The brake control unit 17 of the electronic brake system 1 is connected via electrical lines to actuator means, which exert influence on the setting of the brake pressure on the wheel brakes 6 according to the activation by the brake control unit 17. The actuator means of the brake system 1 for setting the brake pressure comprise axle modulators 20, 21, which control the brake pressure on both sides of an axle. In the exemplary embodiment shown, the brake system 1 has two axle modulators 20, 21. A front axle modulator 20 in this instance is associated with the front axle 3 and the first brake circuit 14. It is connected to the brake control unit 17 by a CAN connection 47. A rear axle modulator 21 is associated with the rear axle 4 and the second brake circuit 15. It is connected to the brake control unit 17 by a CAN connection 48.

Both axle modulators 20, 21 are connected to the speed sensors 23 of the respective axles 3, 4 in a signal-transmitting manner. When the brake system 1 is operating, the axle modulators 20, 21 record the speed measurements 22, 33 and, possibly after evaluation by an electronic system, transmit them via the CAN connection 47, 48 to the brake control unit 17, which then calculates the nominal values of the brake pressures and sends them to the respective axle modulators 20, 21. The brake pressure to be set is thereby determined by the brake control unit 17, wherein the brake control unit 17 receives the speed measurements 22 of the front axle 3 and the speed measurements 33 of the rear axle 4 via the CAN connections 47, 48 and evaluates them.

By evaluating the speed measurements 22, 33, the brake control unit 17 draws a conclusion about the tendency of the respective wheel 5 to lock. Specifically, if the triggered braking force exceeds the maximum transmissible braking force to one or more wheels, said wheels begin to lock, as a result of which the motor vehicle 2 can become unstable. Using the speed sensors 23, the antilock function of the brake control unit 17 monitors the speed of each wheel 5.

The rear axle modulator 21 comprises two pneumatically independent pressure control circuits, each with a valve arrangement 39 having an inlet valve and an outlet valve. If there is a tendency to lock or spin, the rear axle modulator 21 modifies the brake pressure requested for the rear axle 4 by the brake control unit 17.

A pressure control valve 16 is associated with each of the wheel brakes 6 of the front axle 3, and said valves can be adjusted by control signals 19 from the brake control unit 17. Each of the pressure control valves 16 is a combination of two solenoid valves, namely an inlet valve and an outlet valve. The inlet valve principally serves here to increase pressure and/or to maintain the pressure in the brake cylinder 7, whereas the outlet valve is opened to reduce the brake pressure and ventilates the respectively connected brake cylinder 7. An antilock function of the brake system 1 is implemented on the front axle 3 via the pressure control valves 16 and is supported by the axle modulator 20 of the front axle 3.

The brake control unit 17 is configured to receive a driver brake request 32 via the brake signal transmitter 9 and to receive external brake requests 26, such as from driver assistance systems of the motor vehicle 2, in order to adjust a brake pressure on the wheel brakes in accordance with the brake requests. Furthermore, the brake control unit 17 determines the brake pressure on the wheel brakes 6 according to the results of its integrated brake management functions. In accordance with the stability functions, such as an antilock function, the brake control unit 17 recognizes deviations from the normal driving state and, in the event of hazards, reacts to the dangerous situation by adjusting the brake pressure.

The antilock function is to be understood such that the brake control unit 17 monitors the slip of the wheels 5 using the recorded speed measurements 22, 33 and intervenes when a locking tendency is identified. Here, a motion quantity (reference sign 38 in FIG. 2) determined from the speed measurements 22, 33, such as the wheel velocity, is compared with a calculated or measured reference value 24 of the corresponding motion quantity of the motor vehicle 2 at the same time of measurement in each case. If a locking tendency of the wheel 5 is recognized based on the wheel slip determined in this way, i.e. if a predetermined slip threshold is reached or exceeded, then the brake control unit 17 changes the adjustment of the brake pressure. Thus in a first step, the brake pressure falls in order to then regulate the brake pressure of the wheel 5 in question along the slip threshold. In the exemplary embodiment shown, a longitudinal acceleration sensor 25 is arranged on the motor vehicle 2, and the brake control unit 17 derives the desired reference values 24 from the measurement signals of said sensor. If a suitable motion quantity of the motor vehicle 2 is known from other modules of the brake system 1, then the corresponding information is provided to the brake control unit 17 as a reference value 24 for slip detection.

Further brake management functions include, for example, deceleration control, brake force distribution, brake lining wear control or a brake assistant.

A memory element 30 for storing an initial pressure distribution ratio value determined in the driver braking mode (reference sign 29 in FIG. 2) is assigned to the brake control unit 17, which is explained below on the basis of FIG. 2. In all cases, the same features are identified in FIG. 2 with the same reference signs as in FIG. 1.

Figure 2:
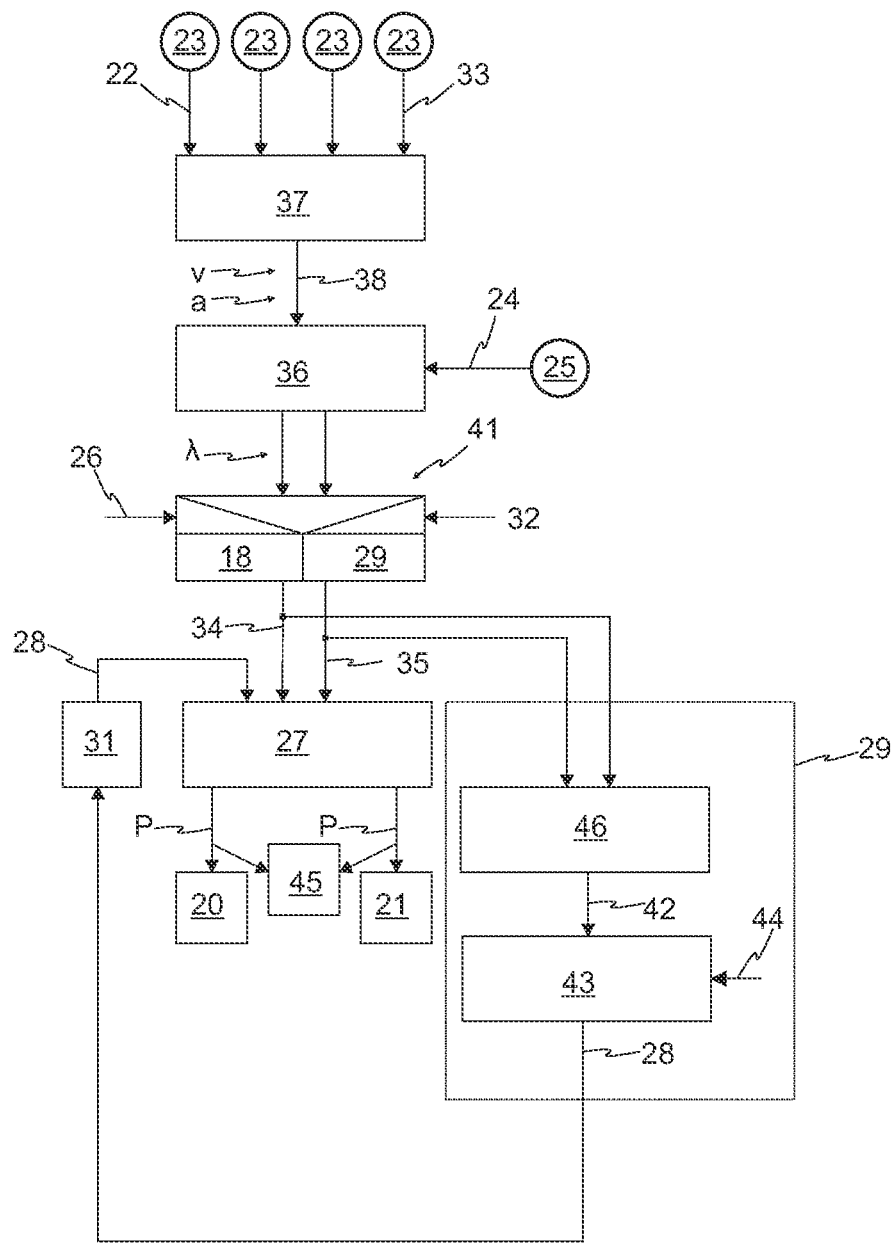
FIG. 2 a flow chart of a method for operating the brake system according to FIG. 1.

FIG. 2 shows in a flow chart an exemplary embodiment of a method for operating the electronic brake system, wherein the brake control unit 17 determines the brake pressures P acting on the wheel brakes by controlling 27 an ideal pressure distribution ratio 45 of the brake pressures P acting on the wheel brakes of the front axle to the brake pressures P acting on the wheel brakes of the rear axle of the motor vehicle 2. The ratio of the brake pressures of the front axle to the brake pressures of the rear axle, in which the same wheel slip is detected on the wheels, is taken as the ideal pressure distribution ratio here.

By regulating 27 the pressure distribution ratio 45, an undesirable intervention by the anti-lock function is prevented, and it is prevented or delayed as long as is actually possible under the given physical conditions. All of the wheels of the motor vehicle lock simultaneously or almost simultaneously.

In a driver braking mode 29, only the brake control unit 17 executes a driver brake request 32 and adjusts the brake pressure in the brake cylinders 7 as a function of the position of the brake pedal 8. A pressure control mode 18 is different from the driver braking mode 29, wherein the brake control unit 17 executes brake requests other than the driver brake request 32 alternatively or additionally to the driver brake request 32.

The controller 27, the actuating variable of which is the values of the brake pressures, takes into consideration an initial pressure distribution ratio value 28 of the pressure distribution ratio, said value being ascertained in a driver braking mode 29 and being kept available for later consideration in the pressure control mode 18. A memory element 30 for storing 31 the pressure distribution ratio determined in the driver braking mode 29 is assigned to the brake control unit 17 and is handled as an initial pressure distribution ratio value 28 for the controller 27 at the outset of the pressure control mode 18.

The speed measurements 22, 33 of the speed sensors 23 on the wheels are linked with a reference value 24 of a motion quantity of the motor vehicle at the same time of measurement in each case in a manner that represents wheel slip, and slip values are calculated for each wheel, specifically the wheel slip λ in the exemplary embodiment according to FIG. 2. To establish a link 36 with the reference value 24, the motion quantities 38 corresponding to the motion quantity of the motor vehicle, which was evaluated as a reference value 24, are identified during an evaluation 37 of the speed measurements 22, 33.

In the exemplary embodiment according to FIG. 2, the velocity v is considered a motion quantity 38, wherein the wheel slip λ is determined by the following formula:

$$\lambda = (v - v_{Veh})/v_{Veh}$$

Instead of the velocity v, the acceleration a can alternatively be considered as the motion quantity 38.

The controller 27 identifies nominal values for the respective brake pressure P on the axles and sends appropriate specifications to the actuators of the brake system, i.e. especially the axle modulators (reference signs 20, 21 in FIG. 1) in the exemplary embodiment. Alternatively or additionally, the brake control unit influences the brake pressure P by a corresponding activation of the pressure control valves 16 with control signals 19, as long as valves of this type are associated with the respective wheel of the motor vehicle 2.

In a detection step 41, the brake control unit detects the presence of braking requirements, i.e. the presence of a driver brake request 32 and/or an external brake request 26 in addition to the internal braking requirements of the brake management functions integrated into the brake control unit 17. If there is only a driver brake request 32, then the brake control unit effects the adjustment of the brake pressure by controlling 27 the pressure distribution ratio 45 in the driver braking mode 29.

In the driver braking mode 29, an initial pressure distribution ratio value 28 for the controller 27 is calculated, which is kept available by storage for subsequent consideration during braking operations, in particular braking in the pressure control mode 18. Of these, a first slip value 34 for the front axle and a second slip value 35 for the rear axle are drawn from the values of the wheel slip λ, which were determined during the observation of the locking tendency. The first slip value 34 for the front axle can be one of the two available values of the wheel slip λ or an average value of the two slip values for the wheels of the front axle. Accordingly, the second slip value 35 for the rear axle is one of the two wheel slips λ identified for the anti-lock function or an average value of the two values.

The first slip value 34 and the second slip value 35 for the pair of front axle and rear axle being considered are set in relation to each other 46, and a distribution index 42 is thereby determined. The distribution index 42 is a factor that, in a link 43 with a predetermined pressure distribution ratio 44, results in the initial pressure distribution ratio value 28 for the control 27 of the pressure distribution ratio 45. The predetermined pressure distribution ratio 44 is the current value of the pressure distribution ratio that is dynamically determined by the electronic brake system.

The distribution index 42 corresponds to the loading condition of the motor vehicle, and so, by linking 43 with the predetermined value of the pressure distribution ratio 44, an actual pressure distribution ratio can be identified, which is significantly closer to the ideal pressure distribution ratio 45 of the motor vehicle 2 in the current loading condition.

To determine the distribution index 42, the first slip values 34 for the front axle and the second slip values 35 for the rear axle are considered inversely with reference to the respective pressure ratios. This corresponds to the assumption that, in the ideal pressure distribution ratio, the slip values 34, 35 of the axles of the motor vehicle 2 under consideration are the same and/or that there is no differential slip.

The initial pressure distribution ratio value 28, which is set as a basis at the beginning of the control process 27, is advantageously determined in the driver braking mode 29 during comparatively weak vehicle decelerations, i.e. negative accelerations of e.g. −1 m/s$^2$ to −1.5 m/s$^2$, in order to reduce dynamic influences.

The adjustment of the brake pressure P in a pressure control mode 18 with a controller 27 while taking into account an initial pressure distribution ratio value 28 that was determined in the driver braking mode 29 can also be carried out in motor vehicles with multiple axles. In further exemplary embodiments, the stored initial pressure distribution ratio value 28 is also the basis of the control 27 of the pressure distribution ratio 45 in the driver braking mode 29.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1. Brake system
2. Motor vehicle
3. Front axle
4. Rear axle
5. Wheel
6. Wheel brake
7. Brake cylinder
8. Brake pedal
9. Brake signal transmitter
10. Brake line
11. Brake line
12. Pressure medium supply
13. Pressure medium supply
14. First brake circuit
15. Second brake circuit
16. Pressure control valve
17. Brake control unit
18. Pressure control mode
19. Control signal
20. Pressure modulator front axle
21. Pressure modulator rear axle
22. First speed measurements
23. Speed sensor
24. Reference value
25. Longitudinal acceleration sensor
26. External brake request
27. Controller
28. Initial pressure distribution ratio value
29. Driver braking mode
30. Memory element
31. Storing
32. Driver brake request
33. Second speed measurements
34. First slip value
35. Second slip value
36. Link
37. Evaluation
38. Motion quantity
39. Valve arrangement
40. Brake signal line
41. Detection step
42. Distribution index
43. Link
44. Predetermined pressure distribution ratio
45. Pressure distribution ratio
46. Setting in relation
47. CAN connection
48. CAN connection
P Brake pressure
$\lambda$ Wheel slip
v Velocity
a acceleration

The invention claimed is:

1. A method for operating an electronic brake system for motor vehicles, the method comprising:
   determining, by a brake control unit, respective brake pressures acting on wheel brakes by controlling a pressure distribution ratio of brake pressures acting on wheel brakes of a front axle to brake pressures acting on wheel brakes of a rear axle of the motor vehicle;
   receiving, by the brake control unit, driver brake requests determined by a driver of the motor vehicle and/or external brake requests; and
   determining, by the brake control unit, appropriate brake pressures,
   wherein the brake control unit takes into consideration an initial pressure distribution ratio value, which is ascertained in a driver braking mode or in a pressure control mode and is stored and kept available for later consideration,
   wherein the initial pressure distribution ratio value is determined:
      by recording a first speed measurement of the front axle and a second speed measurement of the rear axle, and
      by recording, at a same time of measurement, a velocity of the motor vehicle as a reference value,
      by linking each of the speed measurement of the front axle and the speed measurement of the rear axle with the reference value in a manner that represents a wheel slip on the respective axle, and a first slip value relating to the front axle and a second slip value relating to the rear axle, which are generated in this way, are set in relation to each other, and
      by linking a distribution index thereby determined with a predetermined pressure distribution ratio.

2. The method as claimed in claim 1, wherein to determine the slip values from the first speed measurement of the front axle and from the second speed measurement of the rear axle, a velocity is identified and is linked with the reference value.

3. The method as claimed in claim 1, wherein the initial pressure distribution ratio value for the controller is determined during braking operations with accelerations between $-1$ m/s$^2$ and $-1.5$ m/s$^2$.

4. An electronic brake system of a motor vehicle, the electronic brake system comprising:
   one wheel brake and one speed sensor per wheel;
   an electronic brake control unit configured to:
      determine respective brake pressures acting on wheel brakes by controlling a pressure distribution ratio of brake pressures acting on wheel brakes of a front axle of the motor vehicle to brake pressures acting on wheel brakes of a rear axle of the motor vehicle,
      receive driver brake requests determined by a driver of the motor vehicle and/or external brake requests,
      receive and evaluate speed measurements of the speed sensors of the wheels, control an ideal pressure distribution ratio of brake pressure at the front axle to brake pressure at a rear axle while taking into account the speed measurements, and determine an initial pressure distribution ratio value by:
recording a first speed measurement of the front axle and a second speed measurement of the rear axle, recording, at a same time of measurement, a velocity of the motor vehicle as a reference value, linking each of the speed measurement of the front axle and the speed measurement of the rear axle with the reference value in a manner that represents a wheel slip on the respective axle, and a first slip value relating to the front axle and a second slip value relating to the rear axle, which are generated in this way, are set in relation to each other, and linking a distribution index thereby determined with a predetermined pressure distribution ratio; and a memory configured to store the initial pressure distribution ratio value for controlling the ideal pressure distribution ratio.

5. A motor vehicle comprising:
the brake system as claimed in claim 4,
the front axle and the rear axle,
a plurality of wheels, and
a drivetrain.

6. A method for operating an electronic brake system for motor vehicles, the method comprising:

determining, by a brake control unit, respective brake pressures acting on wheel brakes by controlling a pressure distribution ratio of brake pressures acting on wheel brakes of a front axle to brake pressures acting on wheel brakes of a rear axle of the motor vehicle;

receiving, by the brake control unit, driver brake requests determined by a driver of the motor vehicle and/or external brake requests;

determining, by the brake control unit, appropriate brake pressures, wherein the brake control unit takes into consideration an initial pressure distribution ratio value, which is ascertained in a driver braking mode or in a pressure control mode and is stored and kept available for later consideration, wherein the initial pressure distribution ratio value is determined:

by recording, a first speed measurement of the front axle and a second speed measurement of the rear axle, and by recording, at the same time of measurement, an acceleration of the motor vehicle as a reference value, by linking each of the speed measurement of the front axle and the speed measurement of the rear axle with the reference value in a manner that represents a wheel slip on the respective axle, and a first slip value relating to the front axle and a second slip value relating to the rear axle, which are generated in this way, are set in relation to each other, and by linking a distribution index thereby determined with a predetermined pressure distribution ratio.

7. The method as claimed in claim 6, wherein to determine the slip values from the first speed measurement of the front axle and from the second speed measurement of the rear axle, an acceleration is identified and is linked with the reference value.

* * * * *